United States Patent [19]

Fourrey

[11] Patent Number: 4,569,563
[45] Date of Patent: Feb. 11, 1986

[54] SLIDE ELEMENT EMPLOYING BALLS AND SLIDE STRUCTURE INCLUDING SAID ELEMENT

[75] Inventor: François Fourrey, Montbeliard, France

[73] Assignee: Cycles Peugeot, Valentigney, France

[21] Appl. No.: 600,716

[22] Filed: Apr. 16, 1984

[30] Foreign Application Priority Data

Apr. 15, 1983 [FR] France ................ 83 06233

[51] Int. Cl.$^4$ ............ F16C 29/04; B60N 1/02; A47C 1/02; A47B 88/00
[52] U.S. Cl. ................ 308/6 R; 296/65 R; 297/311; 308/3.8; 312/333; 312/341 NR
[58] Field of Search ........... 308/6 R, 3 A, 3 R, 3.8, 308/3.6; 296/63, 65 R; 297/311, 316, 344, 385; 248/393, 430; 312/348, 345, 346, 347, 341, 343, 342, 344, 333

[56] References Cited

U.S. PATENT DOCUMENTS 3,278,223 10/1966 Panhard ............. 296/65 R

FOREIGN PATENT DOCUMENTS

| 826552 | 1/1952 | Fed. Rep. of Germany . | |
| 2605997 | 8/1977 | Fed. Rep. of Germany | 308/3.8 |
| 2151928 | 4/1973 | France . | |
| 2310239 | 12/1976 | France . | |
| 2419839 | 10/1979 | France . | |
| 152631 | 9/1983 | Japan | 297/311 |
| 1421660 | 1/1976 | United Kingdom | 296/65 R |
| 2071486 | 9/1981 | United Kingdom . | |

Primary Examiner—Stuart S. Levy
Assistant Examiner—Thomas R. Hannon
Attorney, Agent, or Firm—Sughrue, Mion, Zinn, Macpeak and Seas

[57] ABSTRACT

In a slide structure employing balls comprising an outer element formed by a U-section element 1 provided with flanges 2, the inner element 8 is constituted by a tube which is deformed in such manner as to include two lateral wings 10 each one of which is between two concave grooves for receiving the balls 16. Beyond the portion of the tube deformed in this way, the tube is bent and devoid of flanges so as to enable it to extend through the opening 3 of the U-section element 1 before resuming its initial section. The tube terminates in fixing tabs. Sheared and deformed portions which are evenly spaced apart along a central longitudinally extending boss 18 of the inner element constitute a rack for driving or locking the inner element relative to the outer element.

9 Claims, 10 Drawing Figures

SLIDE ELEMENT EMPLOYING BALLS AND SLIDE STRUCTURE INCLUDING SAID ELEMENT

The present invention relates to a slide structure employing balls and more particularly to an inner element of such a slide structure.

Slide structures employing balls usually comprise at the present time two section elements, for example U-section elements fitting one inside the other and between which are disposed balls which permit a relative sliding therebetween. However, in many cases, the section elements do not have a sufficient stiffness in particular when the device in which they are mounted is liable to be subjected to brutal forces. Further, the fixing of the section elements on the movable structure and the fixed structure requires the addition of auxiliary members, which complicates the construction of the slide structure.

An object of the invention is therefore to overcome these drawbacks by providing an inner element for combining with an outer U-section element provided with flanges, which has great stiffness and can be easily adapted to various devices.

The invention provides an inner element of a slide structure employing balls which is constituted by a tube which is deformed in such manner as to be relatively flattened and to form at each end portion a lateral projection between two concave portions for receiving the balls.

The inner element being thus formed by deformation of a tube whose wall thickness is not modified, has great stiffness. Further, the inner element is retained within the outer section element by the presence of wings which project from the initial tube but are absent in a transition portion, with the tube having a non-deformed circular cross-sectional shape. Such a transition portion may consequently extend through the opening of the outer section element which permits the non-deformed tube to be fixed outside the section element to the fixed structure or movable structure in accordance with the utilizations.

In one embodiment, the inner element comprises a central boss between two concave portions and this boss is provided with sheared and deformed portions which are evenly spaced apart and constitute a rack so that it can cooperate with a locking device or driving device.

Such an element is particularly adapted to the construction of a motor vehicle seat slide mechanism, one of the elements of the slide mechanism being fixed to the body of the vehicle while the other element is rigid with the frame of the seat.

Features and advantages of the invention will be apparent from the following description of embodiments of the invention which are given merely by way of examples with reference to the accompanying drawings, in which.

Figure 1:
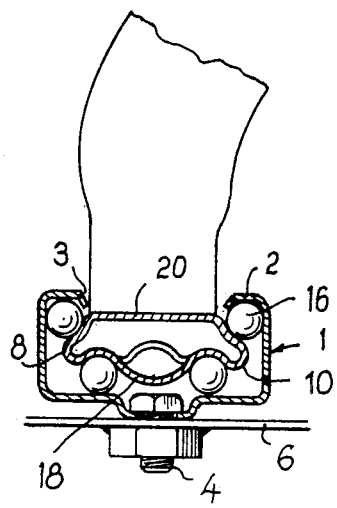
FIG. 1 is a vertical sectional view of a slide structure employing balls and comprising an inner element according to the invention.

The slide structure employing balls shown in the drawings, and in particular in FIG. 1, comprises an outer element 1 formed by a U-section element provided with flanges 2 defining an opening 3. This section element 1 is fixed, for example by screws 4, to a fixed structure 6. Mounted inside this section element 1 is a hollow inner element 8.

Figure 2:
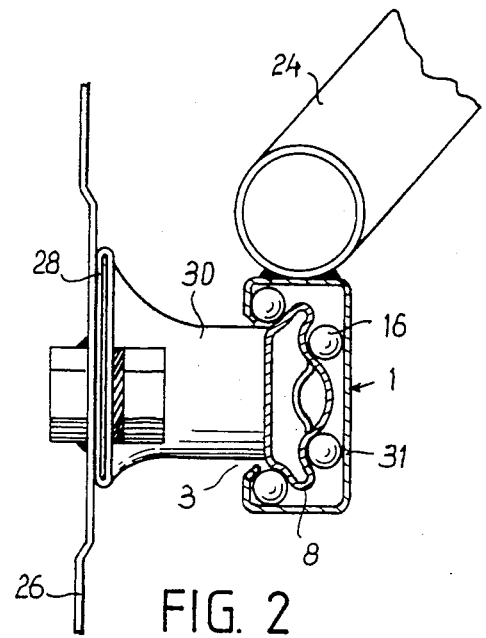
FIG. 2 is a view similar to FIG. 1 of a modification.
Figure 3:
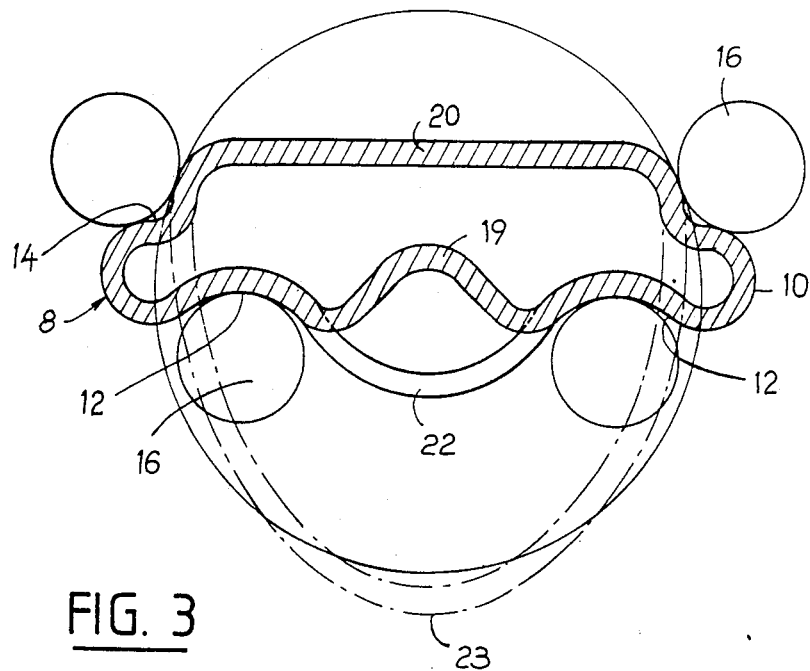
FIG. 3 is a view to an enlarged scale of the slide element of the invention, showing its different production stages.

As shown more particularly in FIGS. 1 to 3, the inner element 8 is constituted by a tube which is deformed in such manner as to have a substantially flattened shape, which shape has a corrugated lower side defining a downwardly projecting convex curvilinear centre portion having adjoining each side of the centre portion a first concave curvilinear portion 12, and a convex curvilinear wing portion 10 adjoining each concave portion 12 and an upper side 20 having at each end a second concave curvilinear portion 14 adjoining the respective wing portion 10. The two concave portions respectively 12 and 14 receive the balls 16 of the slide structure. Between the two concave portions or grooves 12, the element 8 defines a longitudinally extending central boss or rib 18 while between the two grooves 14 the side of this element 8 is substantially planar.

Preferably, the boss 18 includes at even intervals sheared and deformed portions 22 (formed by a setting back of the material without removal of the latter) which constitute in effect a rack.

This portion of the tubular element 8 is formed preferably by deformation of a tube whose circular section is first elongated so as to assume the shape indicated in dot-dash line in FIG. 3 and include the planar side 20. In the course of a second stage of deformation, the curved portion 23 of this blank is moved closer to the planar side 20 and deformed in such manner as to constitute the two wings 10, the concave grooves 12 and 14 and the boss 18. A tool associated with the punch ensuring this deformation perforates the boss 18 and urges back the metal of this boss as indicated at 19 in FIG. 3, so as to form the sheared and deformed portions 22. In such a deformation, only the wall of the tube has changed shape, the material of which this wall is constituted having undergone no modification and moreover the thickness of the wall having undergone no modification. Consequently, the tube retains all its stiffness.

As the inner element 8 is maintained in the section element 1 by the cooperation of its wings 10 with the balls 16 and the flanges 2, the slide structure has great strength and a good mechanical performance.

In the embodiment shown in FIG. 1, the U-section element 1 is fixed to a fixed structure while the inner element 8 is movable, but it will be obvious that the slide structure could be assembled in the opposite way, as for example shown in FIG. 2, the inner element 8 being fixed to a fixed structure 26, for example a body portion of the vehicle while the U-section element 1 is rigid with a movable structure 24.

Figure 8:
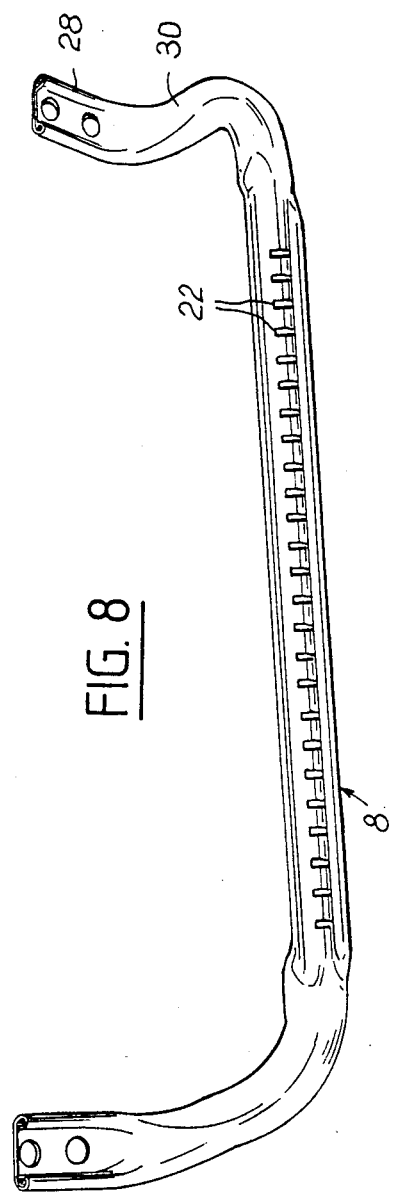
FIG. 8 is a perspective view of the inner element of the slide structure of FIG. 7.

Whatever be the embodiment, the deformed portion of the tube which constitutes the movable element 8 is preferably the central portion of a tube which is extended at each of the ends of this deformed portion and terminates in fixing tabs 28, for example for fixing the element to the structure 26. The tube is then, as shown in FIG. 8, bent at each of the ends of the central deformed portion 8 so as to constitute two projectings arms 30 each of which carries at its end a fixing tab 28.

Each arm 30 has a substantially circular cross-sectional shape 8 and is connected to the inner element 8 of the slide structure by a transition portion having a simply elongated or oval cross-sectional shape, for example as shown in dot-dash lines in the lower part of FIG. 3, so that it is able to extend through the opening 3 of the section element 1.

Figure 7:
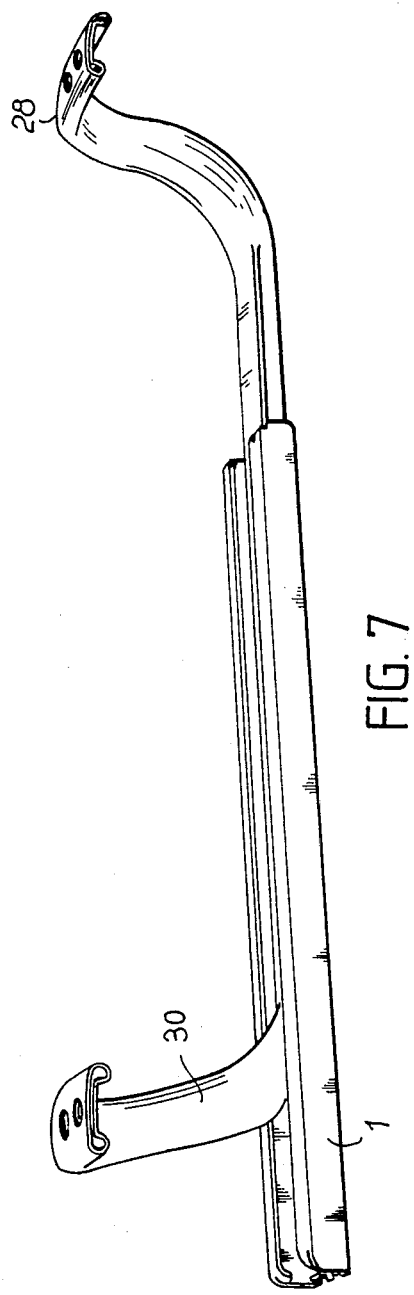
FIG. 7 is a perspective view of a slide mechanism which is more particularly intended for a motor vehicle seat.

The arms 30 may thus easily move along this opening 3, as shown in FIG. 7. This arrangement permits a reduction in the length of the section element 1 and/or of the movable element 8 while allowing considerable movement to the two elements of the slide structure.

In the case of a motor vehicle seat, the element 8 and its arms 30 are preferably rigid with the frame of the cushion of the seat while the section element 1 is fixed to the floor of the vehicle, so that the movable element 8 can be practically part of the frame of the seat and provide it with a strong and relatively small support while allowing it a suitable mobility.

It will be understood that the movable element, whether this be the section element 1 or the inner element 8, may be driven manually, but it is preferably driven by the rack formed by the sheared and deformed portions 22 of the element 8. The section element 1 is in this case provided in its base 31 with an opening corresponding to one, or preferably two, sheared and deformed portions 22, which permits the engagement of each sheared and deformed portion 22 with a drive gear pinion or any other like device.

Figure 6:
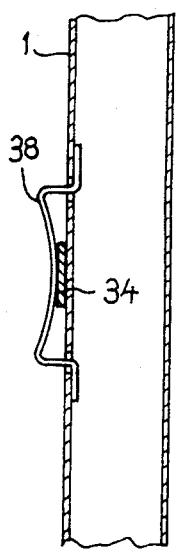
FIG. 6 is a sectional view taken along line F—F of FIG. 5.
Figure 5:
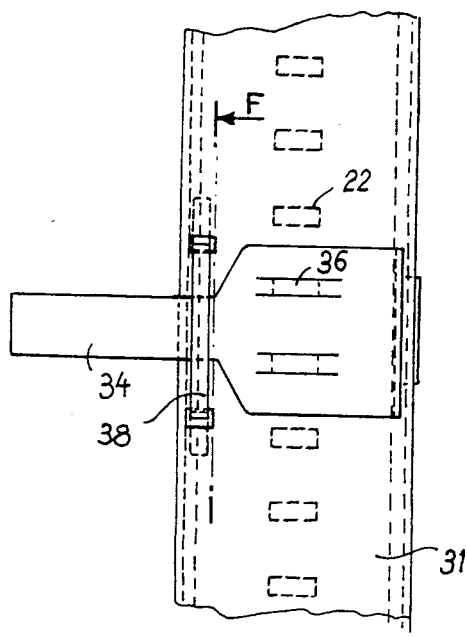
FIG. 5 is a top plan view of the slide portion of FIG. 4.
Figure 4:
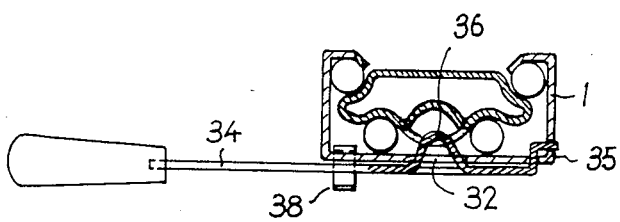
FIG. 4 is a sectional view of the slide mechanism in the region of a locking device.

According to another embodiment, the slide structure is simply locked in the chosen position by a locking device which extends through the opening 32 of the bottom of the section element 1 and cooperates with the sheared and deformed portions 22. FIGS. 4 to 6 show such a locking device which comprises a lever 34 pivotally mounted on the lower portion of the section element 1 in a notch 35 in the bottom of this section element. The lever 34 is provided with one, or preferably two, bosses 36 which extend through the opening 32 and fit in the two sheared and deformed portions 22 facing this opening. A U-shaped spring 38 is fixed under the bottom 31 of the section element 1 and tends to grip the lever 34 against this bottom in the locking position of the portions 22 and, consequently, of the element 8.

A force exerted on the lever 34 is sufficient to separate the bosses 32 from the portions 22 against the action of the spring 38 and thus release the inner element 8 which can move relative to the section element 1. As soon as the lever 34 is released, the spring 38 returns it against the section element 1, which immediately locks the slide structure.

It will be understood that the same device may be employed, whether the section element be fixed or movable, horizontal or vertical.

The slide structure constructed in this way may be employed for any type of application. Although, as seen in FIGS. 7 and 8, the two elements 1 and 8 have rectilinear cooperating portions and the path of the slide structure is also rectilinear, it will be understood that these elements may also be curved.

Figure 9:
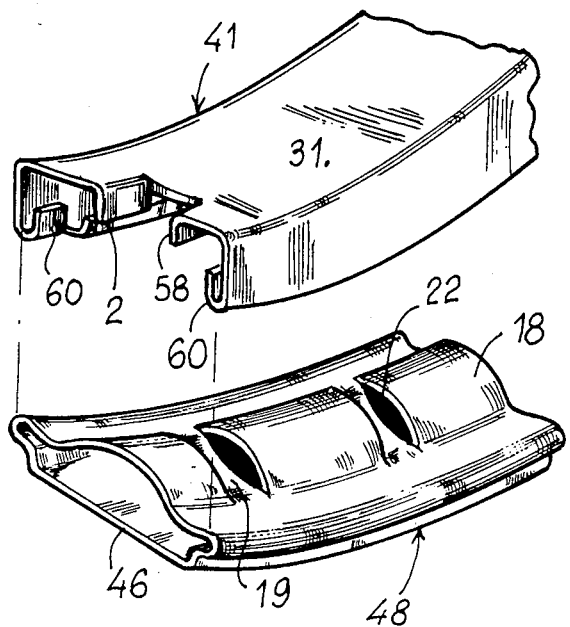
FIGS. 9 and 10 are partial, exploded, perspective views of two modifications of a slide structure according to the invention.

For example, as shown in FIG. 9, the section element 41 may be curved about an axis transverse to its bottom 31 so that the element then assumes the shape of a portion of a cylinder. The inner element 48 is curved in a corresponding manner, its planar side 20 becoming a portion of a cylinder 46. Such a curvature substantially does not modify the shape of the cross-sections of these elements, so that the slide structure operates in the same manner as the rectilinear slide structure.

Figure 10:
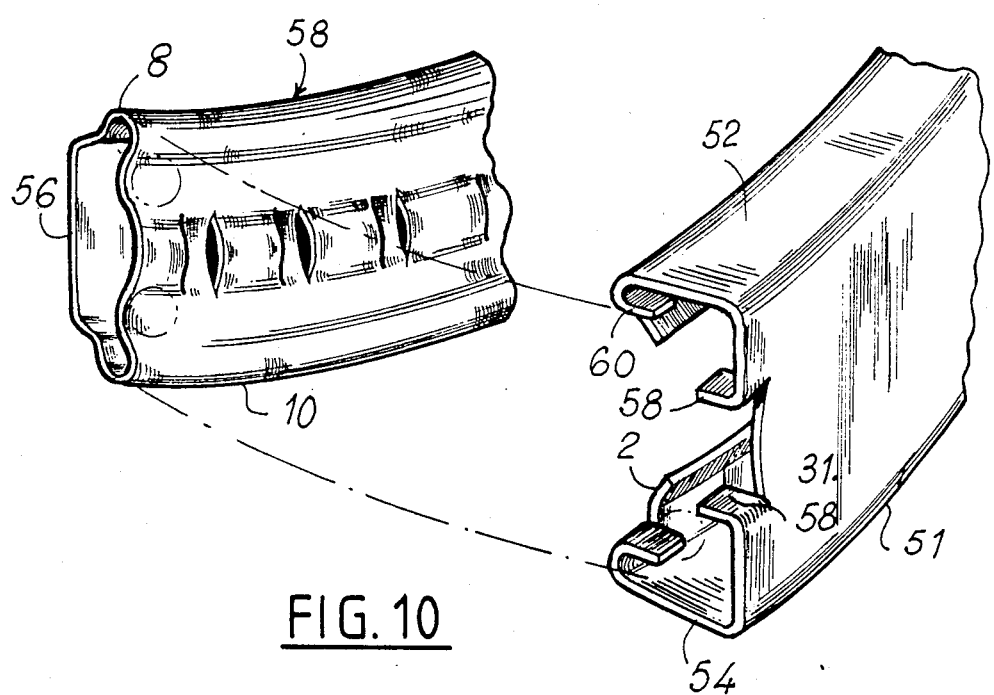

This is also the case of the slide structure 51–58 of FIG. 10, the two elements of which are curved about an axis perpendicular to the bottom 31 of the section element 51 and to the planar side 56 of the inner element 58. The two sides 52, 54 of the U of the section element 51 then constitute two portions of a cylinder, while the wings 8, 10 of the inner element constitute two portions of a ring.

Whatever be the form of the slide structure and of the sliding path, each end of the U-section element 1, 41 or 51, is provided with bent tabs for retaining the balls and preventing their escape to the exterior of the slide structure, in particular when the inner element is shifted. Preferably, these tabs are cut from the material of the section element itself. For example, two tabs 58 are cut in opposite directions in the bottom 31 and folded inwardly in the direction of the flanges 2 so as to retain two rows of balls 16 which roll along the bottom 31.

Two other tabs 60 are cut in the end portion of the flanges 2 and also folded in the direction of the bottom 31, so as to maintain the balls 16 in contact with the flange 2. The displacement of the arms 30 or other end elements in the opening or slot 3 is consequently never liable to cause the balls to escape and the slide structure may be employed with safety.

What is claimed is:

1. An inner element of a slide mechanism employing balls, for combination with an outer U-section element provided with flanges, said inner element being formed by a tube which has in a given part of the tube on cross section a shape of a relatively flattened initially circular tube section, which shape has a corrugated lower side defining a downwardly projecting convex curvilinear centre portion having adjoining each side of the centre portion a first concave curvilinear portion, and a convex curvilinear wing portion adjoining each concave portion and an upper side having at each end a second concave curvilinear portion adjoining the respective wing portion, said concave portions being the cross-sectional shape of longitudinally extending grooves of the inner element, and said convex portion and said wing portions being the cross-sectional shapes of longitudinally extending ribs of the inner element, said grooves being provided for receiving balls of the slide mechanism, the first concave portions being symmetrical relative to a vertical plane so as to extend equally on each side of the respective balls.

2. An inner element according to claim 1, wherein said upper side is planar for placing in facing relation to an opening defined by said flanges of the outer U-section element.

3. An element according to claim 1, further comprising in the rib of the central convex portion sheared and deformed portions evenly spaced apart longitudinally of the tube and constituting a rack along the rib.

4. An inner element according to claim 1, extended at each end of its given part by bent arms provided with integral fixing tabs.

5. A slide mechanism comprising an outer substantially U-section element having two flanges defining an opening, an inner element disposed within the outer element with interposition of balls between the inner element and outer element, said inner element being formed by a tube which has in cross section a shape of a relatively flattened initially circular tube section, which shape has a corrugated lower side defining a downwardly projecting convex curvilinear centre portion having adjoining each side of the centre portion a first concave curvilinear portion, and a convex curvilinear wing portion adjoining each concave portion and an upper side having at each end a second concave curvilinear portion adjoining the respective wing portion, and said concave portions being the cross-sectional shape of longitudinally extending grooves of the inner element, and said convex portion and said wing portions being the cross-sectional shapes of longitudinally extending ribs of the inner element, said grooves receiving said balls of the slide mechanism, the first concave portions being symmetrical relative to a vertical plane so as to extend equally on each side of the respective balls, said inner element having arms adjacent opposite ends of said given part of the inner element, an intermediate portion having a section capable of extending through the opening defined by the flanges of the U-section element connecting each arm to the corresponding end of said deformed portion so that said arms can be moved along said opening.

6. A mechanism according to claim 5, wherein the rib of the central convex portion of the inner element has sheared and deformed portions which are evenly spaced apart longitudinally of the tube and constitute a rack along the rib, the U-section element comprising in facing relation to the rack an opening for the passage of driving means which cooperates with the sheared and deformed portions of the rack.

7. A mechanism according to claim 5, wherein the rib of the central convex portion of the inner element has sheared and deformed portions which are evenly spaced apart longitudinally of the tube and constitute a rack along the rib, the U-section element comprising in facing relation to the rack an opening for the passage of a locking device which cooperates with the sheared and deformed portions of the rack.

8. A mechanism according to claim 7, wherein said outer element has a bottom wall defining an opening, said locking device comprising a locking lever provided with a projection and pivotally mounted on said bottom wall so that said projection extends through said opening of said bottom wall and penetrates one of said sheared and deformed portions of said rack.

9. A mechanism according to claim 5, wherein the inner element and outer element are curved, one of said inner and outer elements being movable along a path in the shape of a portion of a circle relative to the other of said inner and outer elements.

* * * * *